United States Patent [19]

Hirama

[11] Patent Number: 5,486,728
[45] Date of Patent: Jan. 23, 1996

[54] MICROMOTOR

[75] Inventor: Hideo Hirama, Tokyo, Japan

[73] Assignee: Seiko Instruments Inc., Japan

[21] Appl. No.: 106,419

[22] Filed: Aug. 13, 1993

[30] Foreign Application Priority Data

Aug. 25, 1992 [JP] Japan .................................. 4-226276

[51] Int. Cl.$^6$ .................. H02K 5/12; H02K 9/00; H02K 9/197
[52] U.S. Cl. .................. 310/40 MM; 310/52; 310/86
[58] Field of Search .................. 310/52, 64, 86, 310/40 MM, 68 R, 90

[56] References Cited

U.S. PATENT DOCUMENTS

| | | | |
|---|---|---|---|
| 3,680,671 | 8/1972 | Hendershot et al. | 310/216 |
| 3,984,715 | 10/1976 | Kullmann et al. | 310/219 |
| 4,049,984 | 9/1977 | Ishii et al. | 310/42 |
| 4,197,488 | 4/1980 | Kant | 310/49 R |
| 4,419,614 | 12/1983 | Kimura | 310/154 |
| 4,482,829 | 11/1984 | Tardieu et al. | 310/86 |
| 4,709,180 | 11/1987 | Denk | 310/43 |
| 4,843,269 | 6/1989 | Shramo | 310/86 |
| 4,885,730 | 12/1989 | Miyazawa | 310/104 |
| 4,999,533 | 3/1991 | King et al. | 310/86 |
| 5,099,162 | 3/1992 | Sawada | 310/52 |
| 5,184,037 | 2/1993 | Kobayashi et al. | 310/26 |

*Primary Examiner*—Clayton E. LaBalle
*Attorney, Agent, or Firm*—Adams & Wilks

[57] ABSTRACT

A micromotor comprises a cylindrical rotor casing having a central through-hole, and a rotor having a cylindrical, magnetic rotor block fixed on a rotor shaft and inserted in the central through-hole of the rotor casing. First and second bearings support the rotor shaft for rotation and are fitted, respectively, in opposite ends of the central through-hole of the rotor casing and define a sealed rotor chamber therebetween. Stator coils are attached to the outer rotor circumference of the rotor casing, and a stator casing is joined to the rotor casing coaxially with the rotor so as to cover that stator coils. A magnetic fluid is filled in the sealed rotor chamber between the first and second bearings between which is disposed the magnetic rotor block. A series of Peltier elements are attached to the outer circumference of the stator casing and electrically connected to a power supply to absorb heat generated by the operation of the components of the micromotor.

8 Claims, 6 Drawing Sheets 5,486,728

MICROMOTOR

BACKGROUND OF THE INVENTION

1. Field of the Invention

The present invention relates to a micromotor capable of being disposed in a limited space in measuring instruments and medical instruments.

2. Description of the Prior Art

A conventional miniature permanent-magnet motor is shown in FIG. 6 by way of example and has a rotor formed by fixedly mounting a permanent magnet 9 on a shaft 8, and stator coils 4 fixed to the inner circumference of a motor frame so as to surround the permanent magnet 9 with an air gap therebetween. The shaft 8 is journaled in oil less bearings 6 fixed respectively to the opposite end plates of the motor frame.

A micromotor having the same construction as that of the foregoing miniature permanent-magnet motor and designed simply by scaling down the miniature permanent-magnet motor is unable to produce a sufficiently high torque and is liable to be heated to an excessively high temperature due to its inefficient heat radiation.

SUMMARY OF THE INVENTION

Accordingly, it is an object of the present invention to provide a micromotor capable of producing a sufficiently high torque and of operating without being heated to an excessively high temperature.

A micromotor in accordance with the present invention employs a magnetic fluid and Peltier elements. The magnetic fluid enhances the magnetic permeability of the air gap so that the micromotor will produce a sufficiently high torque, and the Peltier elements cool the casings of the micromotor so that the temperature of the micromotor will not rise excessively.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
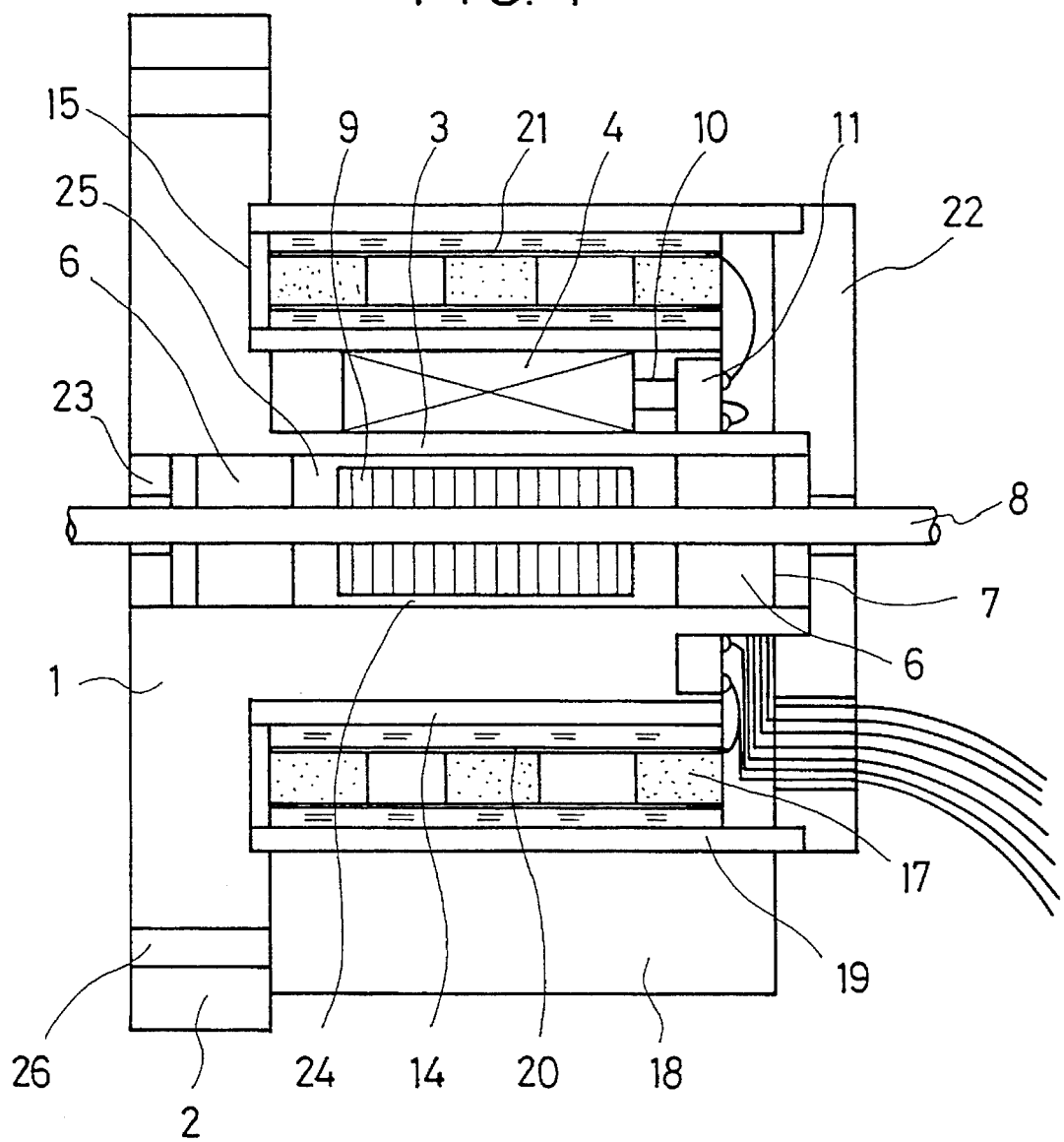
FIG. 1 is a schematic, longitudinal sectional view of a micromotor in a preferred embodiment according to the present invention.
Figure 2:
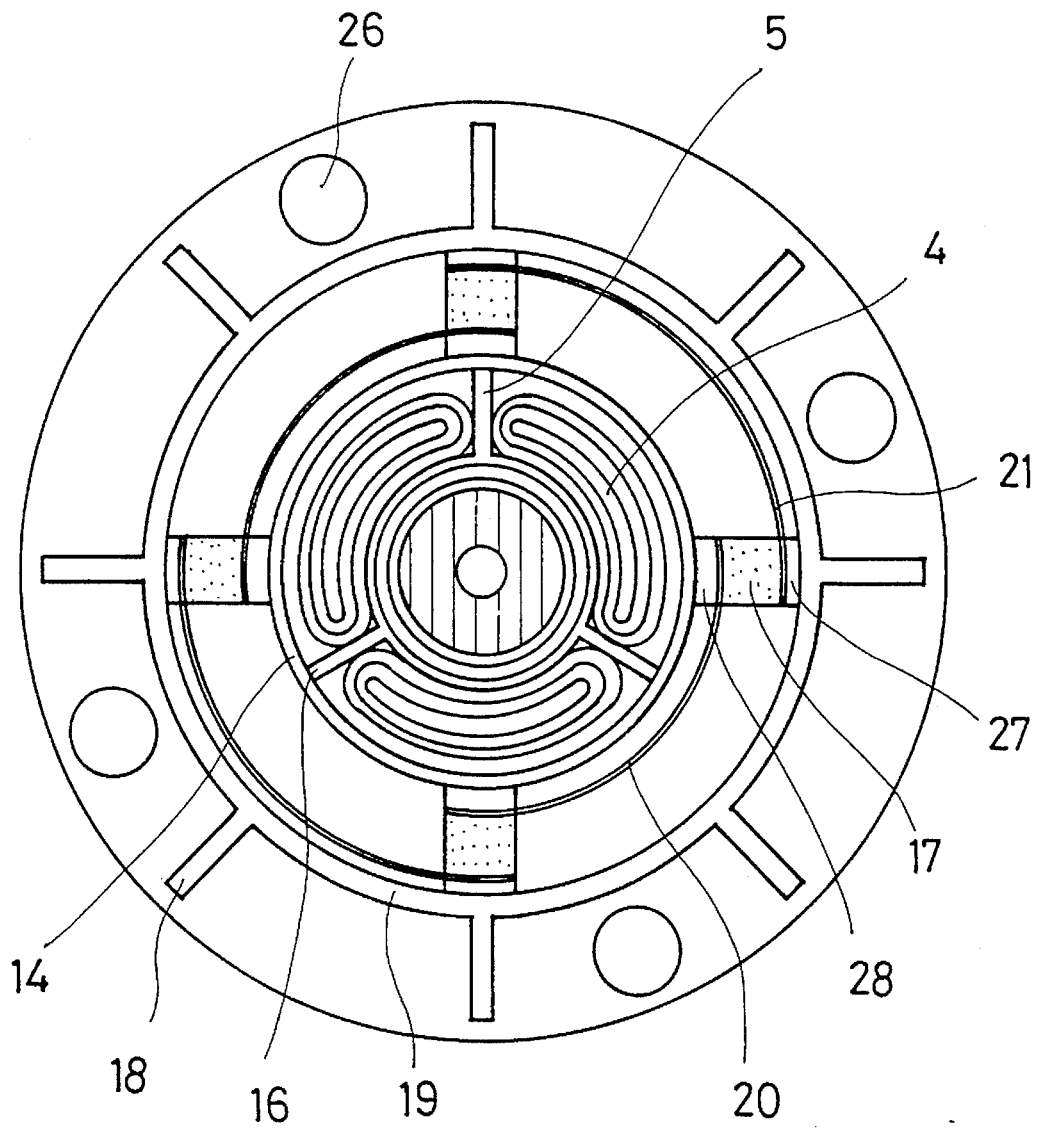
FIG. 2 is a cross-sectional view of the micromotor of FIG. 1.
Figure 3:
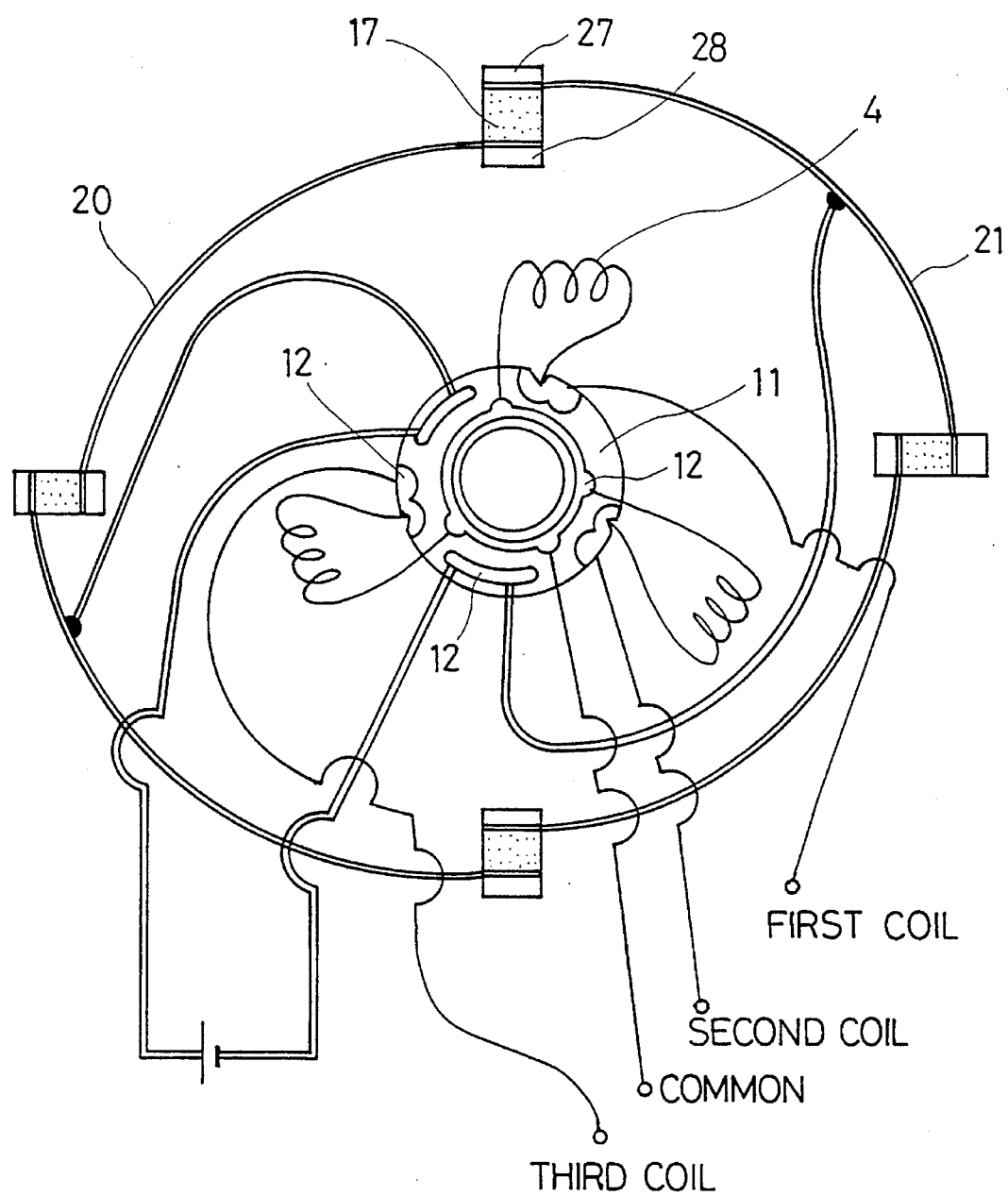
FIG. 3 is an explanatory view of the wiring of the micromotor of FIG. 1.

Referring to FIGS. 1, 2 and 3, a micromotor in a preferred embodiment according to the present invention has a flanged rotor casing 1 integrally having a mounting flange 2 provided with a plurality of through holes 26, and a cylindrical body 3 of a-comparatively small wall thickness axially extending from the mounting flange 2 and having an axial through hole and a plurality of longitudinal spacing ribs 5 radially projecting from the circumference of the cylindrical body 3. Coils 4 are attached to the outer circumference of the cylindrical body 3 of the flanged rotor casing 1 in spaces separated from each other by the spacing ribs 5. Two oil-less bearings 6 are fitted respectively in the opposite ends of the axial through hole of the cylindrical body 3 of the flanged rotor casing 1. The porosity of each oil-less bearing 6 increases toward the outer end. A two-pole magnet 9 is mounted on a rotor shaft 8 to form a rotor. The rotor is inserted in the axial through hole of the cylindrical body 3, and the rotor shaft 8 supporting the two-pole magnet 9 is supported in the oil-less bearings 6. The space between the inner ends of the oil-less bearings 6 is filled up with a magnetic fluid 25. The oil-less bearings 6 contain a liquid lubricant which is the same as the base oil of the magnetic fluid 25.

Figure 4:
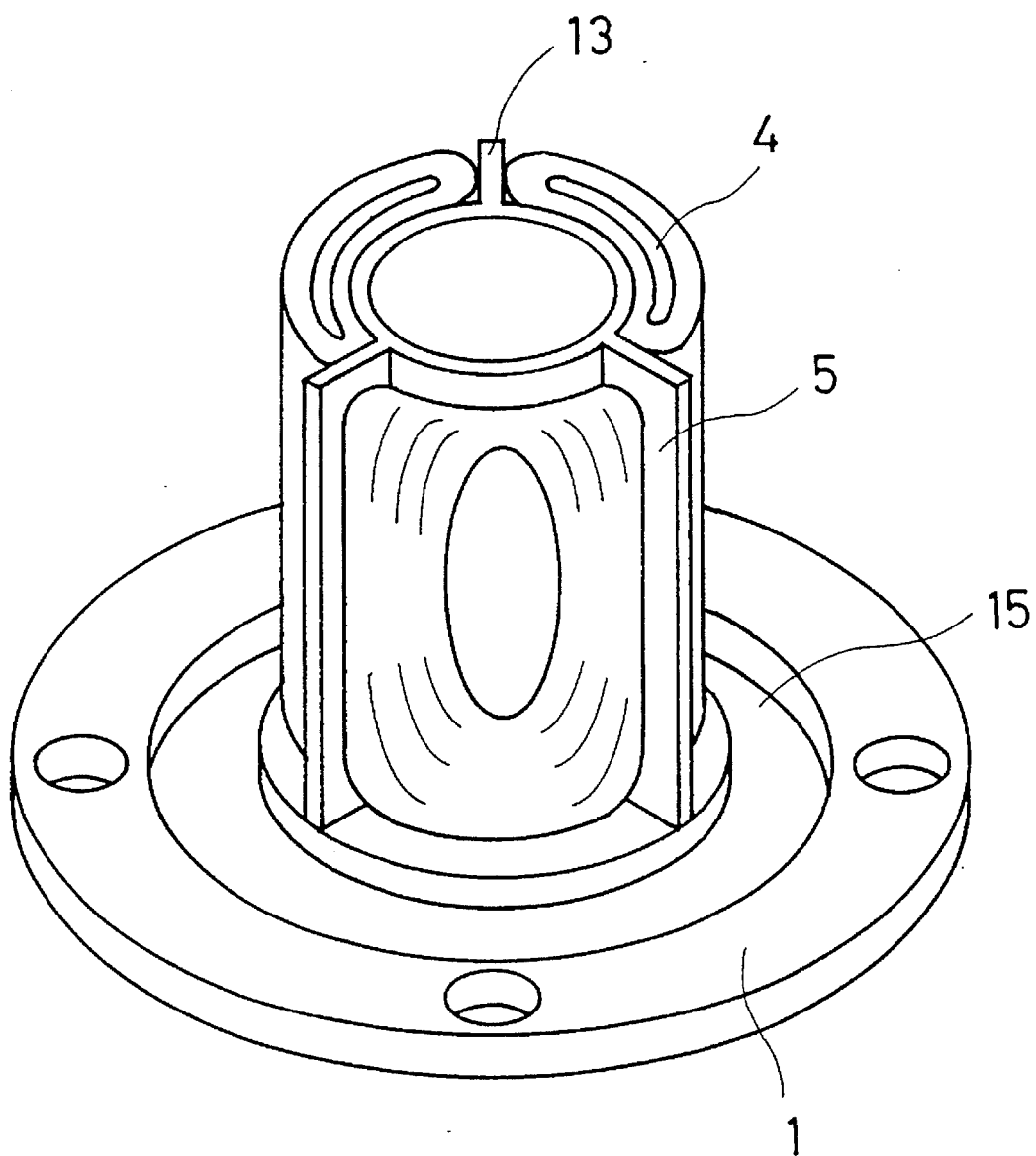
FIG. 4 is a perspective view of a flanged rotor casing included in the micromotor of FIG. 1.

Lead wires 10 connected to the coils 4 are connected respectively to electrodes 12 of a wiring pattern formed on a printed wiring board 11. The printed wiring board 11 is attached by press fit or fixed adhesively to the free end of the cylindrical body 3. A tubular member in the form of a cylindrical inner casing 14 having an inside diameter equal to the diameter of a diameter circumscribing the outer edges 16 of the longitudinal spacing ribs 5 is disposed on the cylindrical body 3 of the flanged rotor casing 1 shown in FIG. 4 so that one end thereof is fitted on a round boss 15 formed on the inner surface of the mounting flange 2 of the flanged rotor casing 1.

Figure 5:
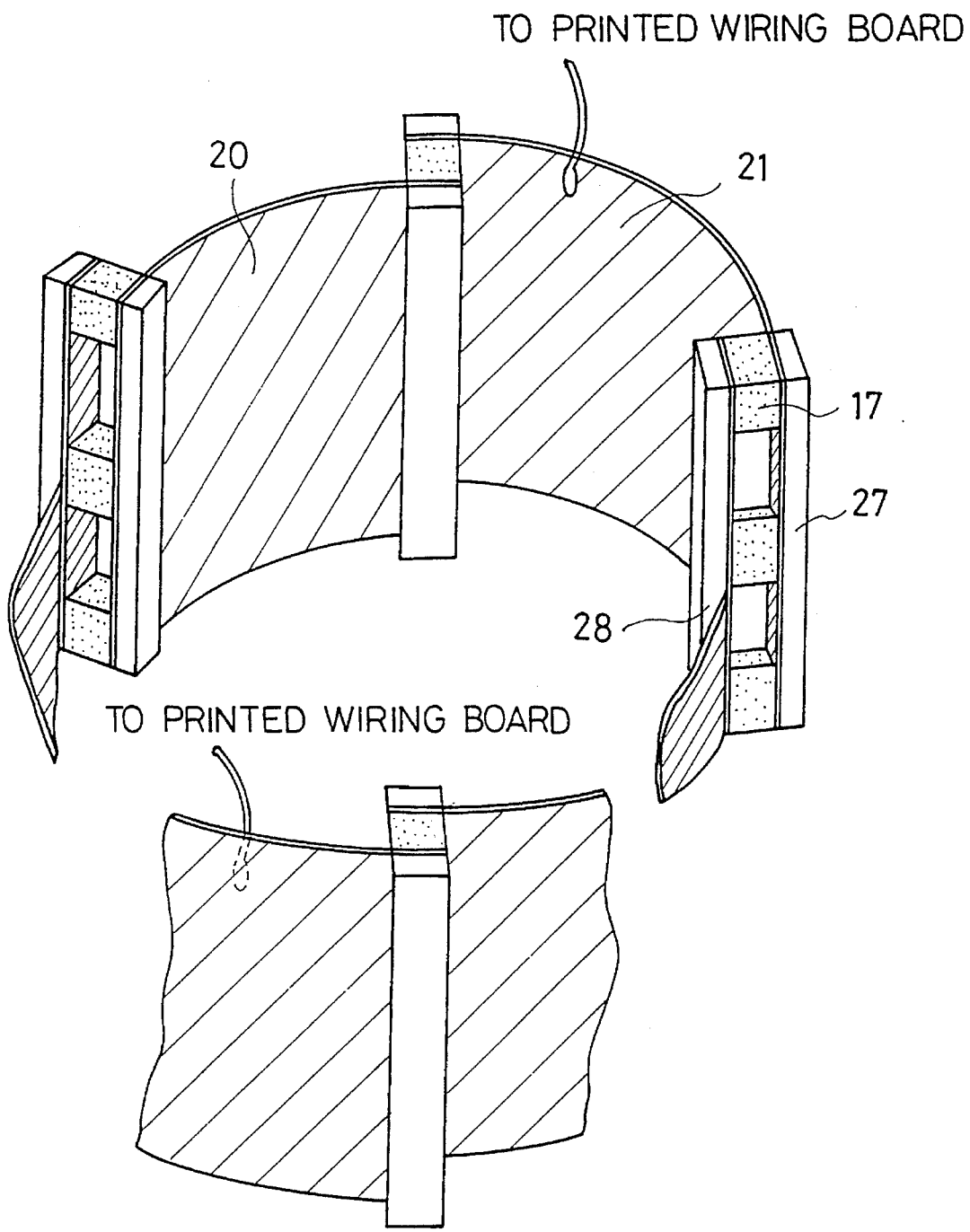
FIG. 5 is a perspective view of a structure holding Peltier elements included in the micromotor of FIG. 1.
Figure 6:
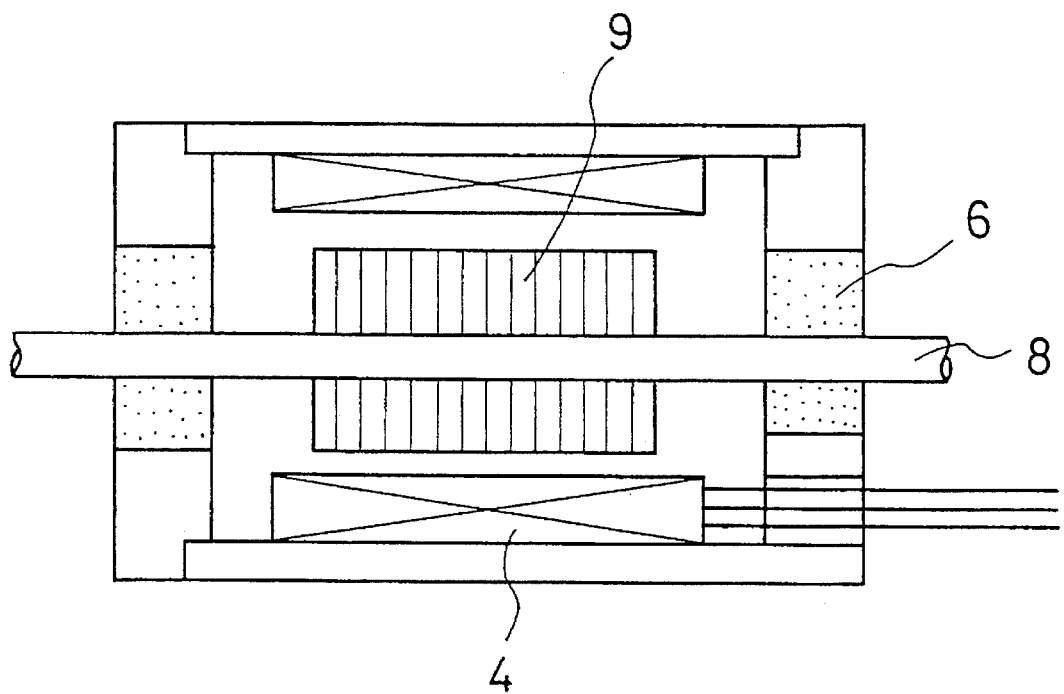
FIG. 6 is a schematic longitudinal sectional view of a conventional miniature permanent-magnet motor.

A plurality of cooling structures each formed by sandwiching a plurality of Peltier elements 17 between ceramic strips 27 and 28 are connected by flexible conductive plates 20 and 21 in a circular arrangement. The flexible conductive plates 20 and 21 are connected to the Peltier elements 17. The cooling structures are extended longitudinally on the outer circumference of the inner casing 14 and fixed to the inner casing 14 by adhesively attaching the ceramic strips 28 with an adhesive, such as a thermosetting epoxy adhesive. A cylindrical outer casing 19 provided with radial heat radiating fins 18 on its outer circumference, having an inner circumference coated with silicone grease and having an inside diameter equal to the diameter of a circle circumscribing the ceramic strips 27 is fixedly fitted on the cooling structures. Heat absorbed by the Peltier elements 17 is transmitted through the ceramic strips 27 and the outer casing 19 and radiated from the heat radiating fins 18. As shown in FIG. 3, the Peltier elements 17 of the adjacent cooling structures are connected by the conductive plates 20 and 21. The flexible conductive plates 20 and 21 shown in FIG. 5 are connected through the wiring pattern of the printed wiring board 11 to a power supply.

A first end plate 22 is joined fixedly to the free ends of the cylindrical body 3 of the flanged rotor casing 1 and the outer casing 19, and a second end plate 23 is fitted in one end of the axial through hole of the flanged rotor casing 1 on the side of the mounting flange 2.

Since the sealed space between the oil-less bearings 6 containing the magnet 9 of the rotor is filled up with the magnetic fluid 25, the gap 24 between the coils 4 and the magnet 9 has a comparatively high magnetic permeability, which enables the micromotor to produce a comparatively high torque. The micromotor having a comparatively small heat capacity tends to be heated to a comparatively high temperature by the heat generated by the coils 4, the magnetic fluid 25 and the oil-less bearings 6. However, since the heat generated by the coils 4, the magnetic fluid 25 and the oil-less bearings 6 heats the inner casing 14 and such heat is absorbed by the Peltier elements 17 and radiated from the outer casing 19, the inner casing 14 is cooled and hence the rise of the temperature of the micromotor is suppressed.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A micromotor comprising: a cylindrical rotor casing provided with a central through hole; a rotor comprised of a cylindrical, magnetic rotor block fixed on a rotor shaft and inserted in the central through hole of the rotor casing; first and second bearings supporting the rotor shaft for rotation and being fitted, respectively, in opposite ends of the central through hole of the rotor casing and defining a sealed rotor chamber therebetween; stator coils attached to the outer circumference of the rotor casing; a stator casing joined to the rotor casing coaxially with the rotor so as to cover the stator coils; a magnetic fluid filled in the sealed rotor chamber between the first and second bearings between which is disposed the magnetic rotor block; heat-dissipating means disposed around the stator coils for dissipating heat generated by the stator coils, magnetic fluid, and first and second bearings during operation of the micromotor, the heat-dissipating means comprising a plurality of Peltier elements disposed circumferentially around the stator coils for absorbing heat by the Peltier effect; and a tubular member encircling the rotor casing at least in the region between the first and second bearings and defining an annular space between the tubular member and rotor casing, the stator coils being disposed interiorly of the tubular member in the annular space and the heat-dissipating means being disposed exteriorly of the tubular member, the Peltier elements being disposed at axially-spaced locations along the tubular member and at circumferentially-spaced locations around the tubular member.

2. A micromotor according to claim 1; including flexible conductive plates interconnecting the Peltier elements and encircling the rotor casing.

3. A micromotor according to claim 2; including ceramic strips sandwiching therebetween the Peltier elements.

4. A micromotor according to claim 3; including a cylindrical casing provided with heat radiating fins on its outer circumference and joined to the rotor casing coaxially with the rotor so as to cover the Peltier elements.

5. A micromotor comprising: means defining a rotor casing having two opposed open ends; a rotor disposed in the rotor casing and having shaft portions extending outwardly through respective open ends of the rotor casing; first and second bearing means disposed in respective open ends of the rotor casing for rotatably supporting the rotor shaft portions and for fluidtightly sealing the interior of the rotor casing within which the rotor rotates; a stator disposed around the rotor casing and having stator coils operative when energized to effect rotation of the rotor; a magnetic fluid confined in the sealed interior of the rotor casing effective to increase the magnetic permeability of the space between the rotor and stator coils to thereby enhance the torque characteristic of the micromotor; heat-dissipating means disposed around the stator for dissipating heat generated by the stator coils, magnetic fluid, and first and second bearing means during operation of the micromotor, the heat-dissipating means comprising a plurality of Peltier elements disposed circumferentially around the stator for absorbing heat by the Peltier effect; and a tubular member encircling the rotor casing at least in the region between the first and second bearing means and defining an annular space between the tubular member and rotor casing, the stator coils being disposed interiorly of the tubular member in the annular space and the Peltier elements being disposed exteriorly of the tubular member.

6. A micromotor according to claim 5; wherein the Peltier elements are disposed at axially-spaced locations along the tubular member and at circumferentially-spaced locations around the tubular member.

7. A micromotor according to claim 6; including flexible conductive plates interconnecting the Peltier elements and encircling the rotor casing.

8. A micromotor according to claim 7; including ceramic strips sandwiching therebetween the Peltier elements.

* * * * *